(12) United States Patent
Cho et al.

(10) Patent No.: US 6,877,076 B1
(45) Date of Patent: Apr. 5, 2005

(54) MEMORY CONTROLLER WITH PROGRAMMABLE CONFIGURATION

(75) Inventors: James Y. Cho, Los Gatos, CA (US); James B. Keller, Palo Alto, CA (US); Mark D. Hayter, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/626,790

(22) Filed: Jul. 24, 2003

Related U.S. Application Data (63) Continuation of application No. 09/665,989, filed on Sep. 20, 2000, now Pat. No. 6,625,685.

(51) Int. Cl.[7] .............................................. G06F 12/02
(52) U.S. Cl. ...................................... 711/157; 711/211
(58) Field of Search ............................ 711/157, 5, 105, 711/211, 212, 220

(56) References Cited

U.S. PATENT DOCUMENTS

| | | |
|---|---|---|
| 5,241,665 A | 8/1993 | MacDonald |
| 5,278,967 A | 1/1994 | Curran |
| 5,307,320 A | 4/1994 | Farrer et al. |
| 5,329,629 A | 7/1994 | Horst et al. |
| 5,412,788 A | 5/1995 | Collins et al. |
| 5,619,471 A | 4/1997 | Nunziata |
| 5,850,632 A | 12/1998 | Robertson |
| 5,895,481 A | 4/1999 | Yap |
| 6,032,214 A | 2/2000 | Farmwald et al. |
| 6,041,393 A | 3/2000 | Hsu |
| 6,049,855 A | 4/2000 | Jeddeloh |
| 6,052,134 A | 4/2000 | Foster |
| 6,154,821 A | 11/2000 | Barth et al. |
| 6,154,825 A | 11/2000 | Murdoch et al. |
| 6,505,269 B1 | 1/2003 | Potter |
| 2001/0005876 A1 | 6/2001 | Srinivasan et al. |

FOREIGN PATENT DOCUMENTS

GB      2 256 293 A      12/1992

OTHER PUBLICATIONS

*Digital Semiconductor 21172, Core Logic Chipset, Technical Reference Manual*, © Digital Equipment Corporation, Apr. 1996, Ch. 3 pp. 17–27; Ch. 4 pp. 49–61.
*82430 PCIset Cache/Memory Subsystem*, © 1993 Intel Corporation, pp. 53–168.
*82420 PCIset Cache/Memory Subsystem*, © 1993 Intel Corporation, pp. 23–149.
EP Search Report for EP app. 01308014.8, Mar. 29, 2004, Broadcom Corp.

*Primary Examiner*—Hiep T. Nguyen
(74) *Attorney, Agent, or Firm*—Garlick Harrison & Markison LLP (57)  ABSTRACT

A memory controller provides programmable flexibility, via one or more configuration registers, for the configuration of the memory. The memory may be optimized for a given application by programming the configuration registers. For example, in one embodiment, the portion of the address of a memory transaction used to select a storage location for access in response to the memory transaction may be programmable. In an implementation designed for DRAM, a first portion may be programmably selected to form the row address and a second portion may be programmable selected to form the column address. Additional embodiments may further include programmable selection of the portion of the address used to select a bank. Still further, interleave modes among memory sections assigned to different chip selects and among two or more channels to memory may be programmable, in some implementations. Furthermore, the portion of the address used to select between interleaved memory sections or interleaved channels may be programmable. One particular implementation may include all of the above programmable features, which may provide a high degree of flexibility in optimizing the memory system.

8 Claims, 9 Drawing Sheets

512 MB CS0 Region, 4K Rows, 1K Columns

| CS0_Row 36AE | 00000000_00011111_11111110_00000000_00000000 |
|---|---|
| CS0_Col 36AI | 00000000_00000000_00000001_11111111_10000000 |
| CS0_Bank 36AM | 00000000_00000000_00000000_00000000_01100000 |

120 →

512 MB CS0 Region, 4K Rows, 1K Columns, Alternative Encoding

| CS0_Row 36AE | 00000000_00011111_11111110_00000000_00000000 |
|---|---|
| CS0_Col 36AI | 00000000_00000000_00000000_01111111_11100000 |
| CS0_Bank 36AM | 00000000_00000000_00000001_10000000_00000000 |

122 →

512 MB CS0 Region, 4K Rows, 1K Columns, 64 Byte Bank Interleave

| CS0_Row 36AE | 00000000_00011111_11111110_00000000_00000000 |
|---|---|
| CS0_Col 36AI | 00000000_00000000_00000001_11111111_00100000 |
| CS0_Bank 36AM | 00000000_00000000_00000000_00000000_11000000 |

124 →

1024 MB CS0 and CS1 Region, 4K Rows, 1K Columns

| CS_Interleave 36AA | 00000000_00000000_00000010_00000000_00000000 |
|---|---|
| CS0_Row 36AE | 00000000_00111111_11111100_00000000_00000000 |
| CS0_Col 36AI | 00000000_00000000_00000001_11111111_10000000 |
| CS0_Bank 36AM | 00000000_00000000_00000000_00000000_01100000 |
| CS1_Row 36AF | 00000000_00111111_11111100_00000000_00000000 |
| CS1_Col 36AJ | 00000000_00000000_00000001_11111111_10000000 |
| CS1_Bank 36AN | 00000000_00000000_00000000_00000000_01100000 |

Fig. 9

MEMORY CONTROLLER WITH PROGRAMMABLE CONFIGURATION

This application is a continuation of U.S. patent application Ser. No. 09/665,989, filed Sep. 20, 2000, now U.S. Pat. No. 6,625,685.

BACKGROUND OF THE INVENTION

1. Field of the Invention

This invention is related to the field of memory controllers.

2. Description of the Related Art

Memory controllers are generally included in systems to interface various devices in the system with the memory. Generally, the memory controller receives a memory transaction, which includes an address, from one of the devices and accesses the memory using the address. More particularly, the memory controller may use a portion of the address to select a storage location in the memory for access in response to the memory transaction. In a typical dynamic random access memory (DRAM) controller, for example, a first portion of the address is a row address for the DRAM and a second portion of the address is a column address for the DRAM. Together, the row and column addresses select a storage location in the DRAM to be accessed in response to the memory transaction.

Various memory controllers have implemented other features as well. For example, memory controllers have been configured to attach to multiple memory sections, and the memory controller may provide a separate select signal (typically referred to as a chip select signal) to each memory section. By asserting one of the chip select signals, one of the memory sections may be selected to respond to a memory transaction (e.g. by receiving the row and column addresses provided by the memory controller and reading or writing the selected storage location). Another portion of the address of memory transactions may be used to determine the chip select signals. Another feature of some memory controllers is interleaving. With interleaving, two or more memory sections may be combined to represent a given address range. Portions of the data corresponding to the address range may be stored in each of the two or more memory sections, and the memory sections may be accessed in sequence to access all of the data corresponding to the address range. Interleaving may reduce the overall latency of the memory transactions by increasing the possibility of having open pages in the memory (e.g. for a set of transactions clustered in a certain address range) by increasing the number of memory sections accessed at one time. This may effectively increase the page size, which may be viewed as the row size of one memory section multiplied by the number of interleaved memory sections. However, a non-interleaved memory system may provide higher bandwidth, since different transactions can be pipelined into the memory sections (although the latency of each individual transaction may be higher than an interleaved system). Non-interleaving may allow for more pages (of a smaller size) than interleaved systems. If the different transactions occur to different pages, these transactions may be more likely to be pipelined into the non-interleaved system.

The various features implemented by memory controllers may attempt to provide good memory performance (e.g. high bandwidth and/or low latency). However, the memory configuration which may deliver the best memory performance may be dependent on the application(s) being executed in a given system. The arrangement of data and instructions used by the application(s) in memory, as well as the pattern of memory transactions performed by the application, may differ from other applications, and the memory configuration which provides the best memory performance may differ from that of other applications. For example, some applications may benefit from an interleaved memory system providing lower latency for each access (e.g. if the memory transactions tend to be clustered in certain address ranges). On the other hand, other applications may benefit from a non-interleaved system (e.g. applications having high numbers of memory transactions, especially if consecutive memory transactions tend to be to disparate addresses). Such applications may benefit from the availability of other memory sections of the non-interleaved configuration to perform the memory transactions. Furthermore, depending upon the arrangement of data in memory, the portions of the address of a memory transaction used to select a storage location in the memory corresponding to the address may affect the performance of the memory system.

Unfortunately, memory controllers have generally been implemented with a relatively fixed configuration. Typically, address ranges may be assigned to each memory section, and certain memory features (such as page mode) may be enabled or disabled. Otherwise, the configuration of the memory controller (and thus the mapping of addresses to storage locations in the memory) is fixed. Thus, design decisions made when designing the memory controller largely determine the performance that the memory system may deliver for a particular application.

SUMMARY OF THE INVENTION

The problems outlined above are in large part solved by a memory controller as described herein. The memory controller provides programmable flexibility, via one or more configuration registers, for the configuration of the memory. The memory may be optimized for a given application by programming the configuration registers. For example, in one embodiment, the portion of the address of a memory transaction used to select a storage location for access in response to the memory transaction may be programmable. In an implementation designed for DRAM, a first portion may be programmably selected to form the row address and a second portion may be programmable selected to form the column address. Additional embodiments may further include programmable selection of the portion of the address used to select a bank. By allowing the row address, column address, and bank selection to be programmably selected from the address, the memory system may be optimized by software for the expected memory access patterns. If memory transactions, clustered relatively close in time, are expected to traverse through large blocks of memory, the bank selection may be drawn from more significant bits than the column selection, for example, allowing the memory transactions to experience an open page timing while leaving other banks available for intervening memory transactions to other addresses.

Still further, interleave modes among memory sections assigned to different chip selects and among two or more channels to memory may be programmable, in some implementations. Furthermore, the portion of the address used to select between interleaved memory sections or interleaved channels may be programmable. Having the interleave, or lack thereof, of memory sections or channels programmable may also provide for flexibility. For example, if accesses to certain address ranges are expected to be accessed with multiple memory transactions clustered close in time, then those address ranges may be represented by two or more interleaved memory sections or channels. Since pages may be open in each of the interleaved memory sections, the interleaving may increase the possibility of receiving transactions which access an open page. On the other hand, other address ranges may not be expected to be accessed with multiple clustered memory transactions, and thus the corresponding memory section or channels may be configured as non-interleaved. The non-interleaved memory sections or channels may have more open pages at different addresses, allowing for different transactions to access an open page.

One particular implementation may include all of the above programmable features, which may provide a high degree of flexibility in optimizing the memory system.

Broadly speaking, a memory controller is contemplated for coupling to a memory and for coupling to receive an address of a memory transaction. The memory controller includes one or more registers programmable with an indication of which portion of the address is used to select a storage location in the memory for access in response to the memory transaction. Coupled to the one or more registers and coupled to receive the address, a circuit is configured to extract the portion of the address for transmission to the memory responsive to the indication in the one or more registers.

Additionally, a system is contemplated. The system comprises a memory and a memory controller coupled thereto. The memory controller is also coupled to receive an address of a memory transaction. The memory controller is programmable with an indication of which portion of the address is used to select a storage location in the memory for access in response to the transaction, and is configured to extract the portion of the address for transmission to the memory responsive to the indication.

Moreover, a method is contemplated. A memory controller is programmed with an indication of which portion of an address of a memory transaction is used to select a storage location in a memory for access in response to the memory transaction. The address of the memory transaction is received in the memory controller. The portion of the address is extracted responsive to the indication.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

System Overview

Figure 1:
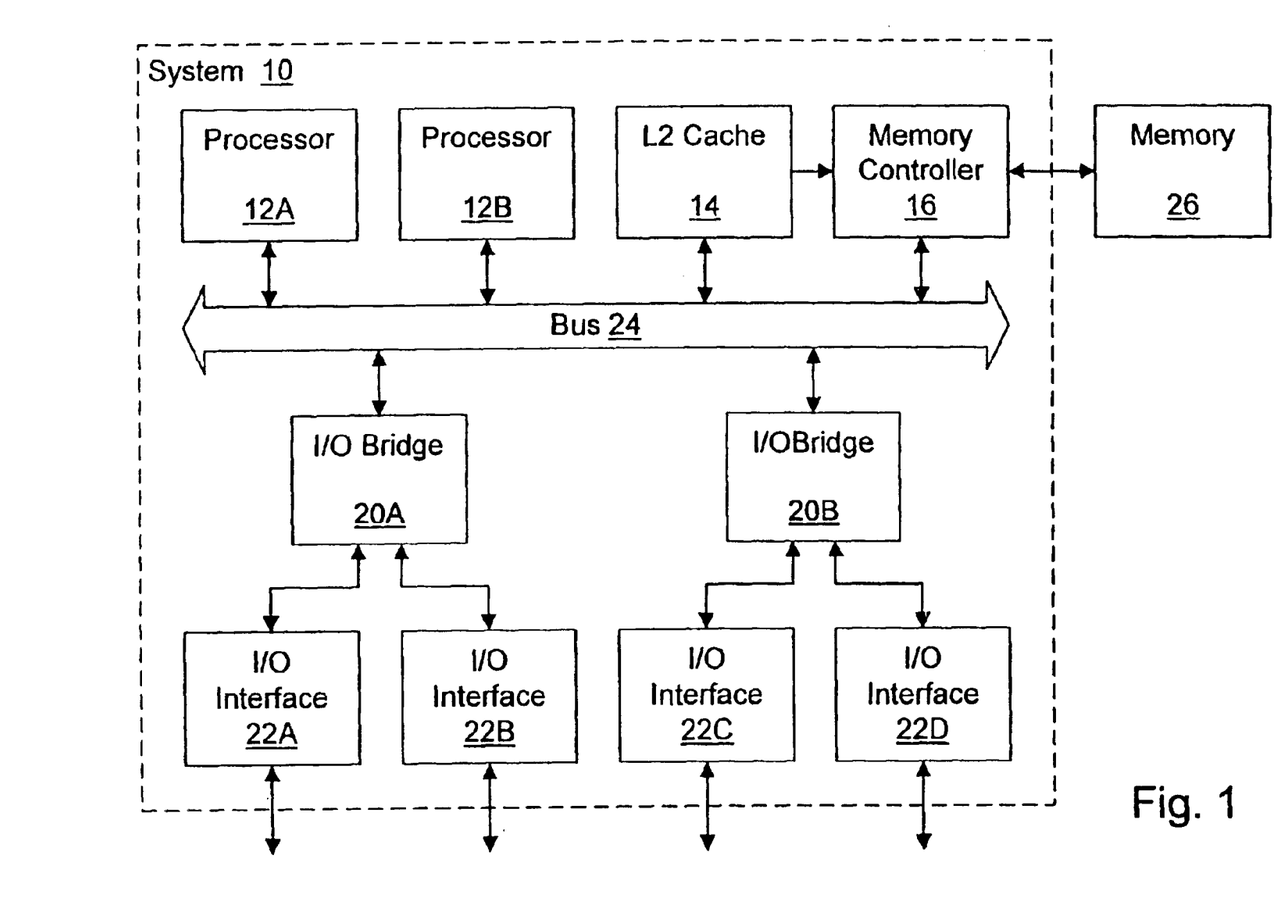
FIG. 1 is a block diagram of one embodiment of a system including a memory controller.

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a pair of input/output (I/O) bridges 20A–20B, and I/O interfaces 22A–22D. System 10 may include a bus 24 for interconnecting the various components of system 10. As illustrated in FIG. 1, each of processors 12A–12B, L2 cache 14, memory controller 16, and 110 bridges 20A–20B are coupled to bus 24. Thus, each of processors 12A–12B, L2 cache 14, memory controller 16, and I/O bridges 20A–20B may be an agent on bus 24 for the illustrated embodiment. I/O bridge 20A is coupled to I/O interfaces 22A–22B, and I/O bridge 20B is coupled to I/O interfaces 22C–22D. L2 cache 14 is coupled to memory controller 16, which is further coupled to a memory 26.

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. While system 10 as shown in FIG. 1 includes two processors, other embodiments may include one processor or more than two processors, as desired.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be an outer level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24.

Memory controller 16 receives a hit signal from L2 cache 14, and if a hit is detected in L2 cache 14 for a memory transaction, memory controller 16 does not respond to that memory transaction. Other embodiments may not include L2 cache 14 and memory controller 16 may respond to each memory transaction. If a miss is detected by U cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

I/O bridges 20A–20B link one or more I/O interfaces (e.g. I/O interfaces 22A–22B for 110 bridge 20A and 110 interfaces 22C–22D for 110 bridge 20B) to bus 24. I/O bridges 20A–20B may serve to reduce the electrical loading on bus 24 if more than one I/O interface 22A–22B is bridged by that I/O bridge. Generally, I/O bridge 20A performs transactions on bus 24 on behalf of I/O interfaces 22A–22B and relays transactions targeted at an I/O interface 22A–22B from bus 24 to that 110 interface 22A–22B. Similarly, I/O bridge 20B generally performs transactions on bus 24 on behalf of 10 interfaces 22C–22D and relays transactions targeted at an I/O interface 22C–22D from bus 24 to that I/O interface 22C–22D. In one implementation, I/O bridge 20A may be a bridge to a PCI interface (e.g. I/O interface 22A) and to a Lightning Data Transport (LDT) 110 fabric developed by Advanced Micro Devices, Inc (e.g. I/O interface 22B). Other I/O interfaces may be bridged by I/O bridge 20B. Other implementations may bridge any combination of I/O interfaces using any combination of I/O bridges. I/O interfaces 22A–22D may include one or more serial interfaces, Personal Computer Memory Card International Association (PCMCIA) interfaces, Ethernet interfaces (e.g. media access control level interfaces), Peripheral Component Interconnect (PCI) interfaces, LDT interfaces, etc.

Bus 24 may be a split transaction bus, in one embodiment. Bus 24 may employ a distributed arbitration scheme, in one embodiment. In one embodiment, bus 24 may be pipelined. Bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

It is noted that system 10 (and more particularly processors 12A–12B, L2 cache 14, memory controller 16, I/O interfaces 22A–22D, 110 bridges 20A–20B and bus 24 may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, bus 24 may not be pipelined, if desired.

It is noted that, while FIG. 1 illustrates I/O interfaces 22A–22D coupled through I/O bridges 20A–20B to bus 24, other embodiments may include one or more I/O interfaces directly coupled to bus 24, if desired.

As used herein, the term "memory transaction" refers to a communication between a device and the memory system. The memory transaction includes an address identifying a storage location in the memory. In the illustrated embodiment, the memory transaction is transmitted on bus 24 to memory controller 16. However, other systems may use other communications media (e.g. packet based transmission, clock-forwarded links, point to point interconnect, etc.). Memory transactions may include read transactions (a transfer of data from memory to the device) and write transactions (a transfer of data from the device to memory).

Memory Controller

Figure 2:
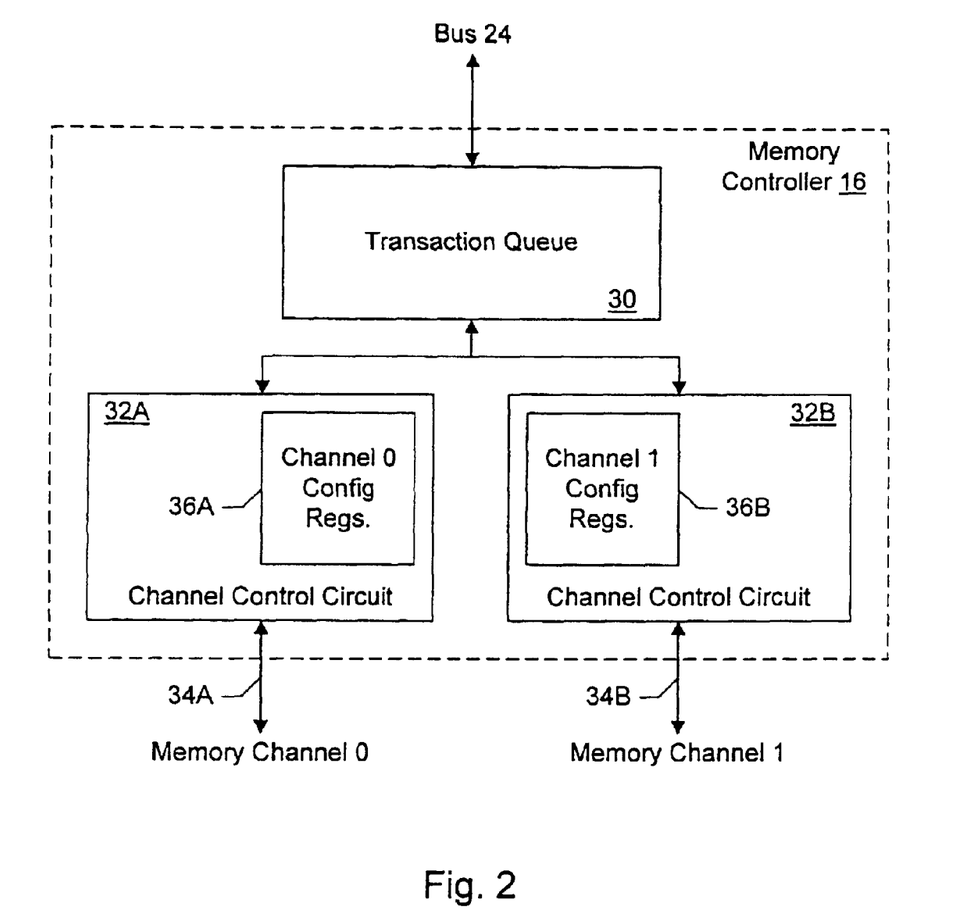
FIG. 2 is a block diagram of one embodiment of the memory controller shown in FIG. 1.

Turning now to FIG. 2, a block diagram of one embodiment of memory controller 16 is shown. Other embodiments are possible and contemplated. In the embodiment of FIG. 2, memory controller 16 includes a transaction queue 30 and a pair of channel control circuits 32A–32B. Transaction queue 30 is coupled to receive memory transactions from bus 24, and is coupled to channel control circuits 32A–32D. Channel control circuit 32A is coupled to a first channel 34A and channel control circuit 32B is coupled to a second channel 34B. Channel control circuit 32A includes a set of one or more configuration registers 36A, and channel control circuit 32B includes a set of one or more configuration registers 36B.

Generally, channel control circuits 32A–32B access memory attached to the corresponding channel 34A–34B in response to memory transactions provided from transaction queue 30. Configuration registers 36A–36B are used to program the configuration of the memory system. Configuration registers 36A–36B may be made visible to software so that the configuration may be programmed. For example, configuration registers 36A–36B may be mapped to certain addresses within the addressable range provided by bus 24 ("memory mapped"), and thus may be programmed by executing store instructions in processor 12A or 12B to the addresses mapped to the registers. Configuration registers 36A–36B may allow for a high degree of flexibility in configuring the memory, thus allowing optimization of the memory system for the applications to be executed on system 10. Additional details regarding the configuration options of one embodiment of memory controller 16 are provided in more detail below.

As illustrated in FIG. 2, memory controller 16 may employ multiple channels. Other embodiments are contemplated employing more channels, as well as embodiments having only a single channel. Each channel control circuit 32A–32B performs memory transactions mapped to the corresponding channel. Additionally, each channel control circuit 32A–32B includes a set of configuration registers 36A–36B. Accordingly, the memory attached to each channel may be configured differently. Additional flexibility in the memory system configuration may be provided via the use of different configuration registers for each channel.

In one embodiment, the two channels may be configurable as interleaved or not interleaved via configuration registers 36A–36B. Non-interleaved channels may provide high bandwidth, as the two channels may be independent of each other and thus may respond to memory transactions in parallel. Interleaved channels may increase the possibility of finding an open page if memory transactions are clustered in certain address ranges, thus decreasing the latency of the memory transactions. Embodiments employing more than two channels may interleave two or more of the channels while having remaining channels non-interleaved, via configuration registers 36A–36B and other configuration registers in the additional channel control circuits.

Transaction queue 30 is configured to receive and queue memory transactions from bus 24, and to issue those transactions to one of channel control circuits 32A–32B. Transaction queue 30 may have access to at least the configuration registers 36A–36B that define which addresses are mapped to which memory channel, to select the channel control circuit to which a given transaction is issued. Alternatively, transaction queue 30 may include one or more shadow registers storing indications which represent the addresses that are mapped to each memory channel, or may include a separate set of programmable registers. Transaction queue 30 may also receive and queue the data for write transactions, and provide that data to the corresponding channel control circuit 32A–32B for updating the memory. Transaction queue 30 may receive and queue data from the corresponding channel control circuit 32A–32B for read transactions, and provide the data on bus 24 for consumption by the device which initiated the memory transaction.

As used herein, the term "channel" refers to a communication path to a memory. The communication path may include the interface signals used to interface to that memory, and is independent of other channels.

As used herein, the term "registers" refer to any clocked storage device. For example, registers may include clocked RAM cells, latches, flip flops, etc.

Figure 3:
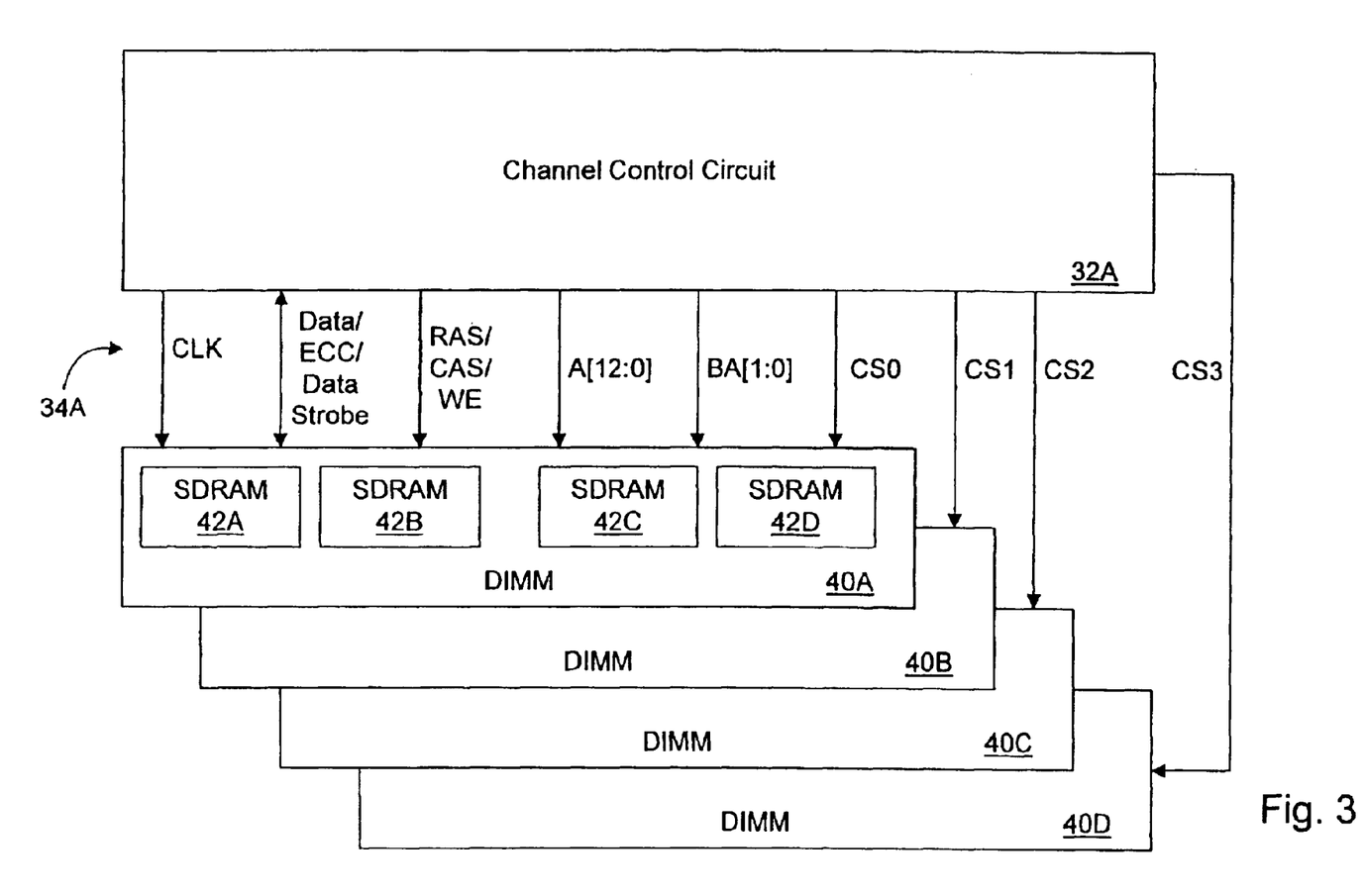
FIG. 3 is a block diagram of one embodiment of a channel control circuit shown in FIG. 2 and the channel to a block of memory.

Turning next to FIG. 3, a block diagram of one embodiment of channel control circuit 32A and channel 34A is shown. Other embodiments are possible and contemplated. Channel 34B may be similar, in one embodiment. The embodiment of FIG. 3 may be suitable for interfacing to SDRAM memory, such as one or more dual inline memory modules (DIMMs) 40A–40D. Each of DIMMs 40A–40D may be populated by one or more SDRAM chips (e.g. SDRAM chips 42A–42D illustrated on DIMM 40A). DIMMs 40A–40D (and optionally one or more DIMMs on channel 34B) may be one embodiment of memory 26 shown in FIG. 1.

Channel 34A as shown in FIG. 3 includes signals for interfacing to DIMMs 40A–40D. More particularly, channel 34A includes a separate chip select line carrying a chip select signal (CS0–CS3) for each DIMM 40A–40D. The chip select signal may be asserted to select the corresponding DIMM 40A–40D to respond to a memory transaction. Mappings of address ranges to chip select signals may be programmed into configuration registers 36A. While each chip select signal is connected to one DIMM 40A–40D, the remaining signals of memory channel 34A may be connected to each of DIMMs 40A–40D.

Channel 34A includes a clock line or lines (CLK) for transmitting a clock signal to DIMMs 40A–40D. Memory channel 34A also includes data transmission lines including lines for the data (e.g. 64 bits of data, in one embodiment), optional error checking and correction code (ECC) information corresponding to the data, and data strobe signals corresponding to each byte of data and the ECC information. Row address strobe (RAS), column address strobe (CAS) and write enable signals are included as well. These signals are used to transmit commands to the DIMM 40A–40D selected using the chip select signals. More particularly, the commands may include an activate command to activate a row of storage locations in a bank. The activate command may include the row address on the address bus (A[12:0]). One or more read or write commands may be issued to the active bank, and each read or write command may include the column address being transmitted on the address bus. Other commands may include a precharge command to close the active bank, a burst terminate command to terminate a burst of data starting at the identified column, etc. Finally, channel 34A includes a bank select signals (BA[1:0]) used to select a bank within the SDRAMs within the selected DIMM 40A–40D. The bank may be transmitted with both the row address and the column address.

While FIG. 3 illustrates one or more DIMMs forming the memory of a channel, other embodiments may form a channel from single inline memory modules (SIMMs), individual RAM chips, etc. Additionally, a single DIMM may receive more than one chip select signal, or multiple DIMMs, SIMMs, or individual RAM chips may share a chip select (and be coupled to different portions of the data bus).

As used herein, the term "row" refers to refers to a set of storage locations in a DRAM. DRAMs are configured with multiple rows, and one row is selected for a transaction by transmitting a row address to the DRAM (e.g. with an activate command on an SDRAM or an assertion of the RAS signal for asynchronous DRAM). The term "column" refers to a storage location within the set of storage locations in each row. One column is selected for a transaction by transmitting a column address to the DRAM (e.g. with a read or write command on an SDRAM or the assertion of the CAS signal for asynchronous DRAM). Thus, DRAM memory is arranged into rows and columns of storage locations forming a two dimensional array of storage locations. A given storage location is selected using a particular row address and a particular column address. The intersection of that row and column within the two dimensional array is the storage location. The number of bits or bytes in the selected storage location may vary from embodiment to embodiment. Furthermore, multiple storage locations may be accessed in parallel to provide one transfer on the data lines between the memory and memory controller 16, and multiple transfers on the data lines (each affecting one or more storage locations in the DRAM memory) may be performed to access all of the data corresponding to a memory transaction.

Multiple reads and/or writes to various columns in the active row may be performed without retransmitting the row address. Reads or writes which are accomplished without retransmitting the row address are often referred to as page mode accesses or referred to as hitting an open page.

A given SDRAM may include multiple sets of rows and columns of storage locations. The term "bank" refers to one set of rows and columns. The bank is selected by transmitting the bank signals during the activate and read/write commands. Other memories besides SDRAMs may include banks of rows and columns as well.

Figure 4:
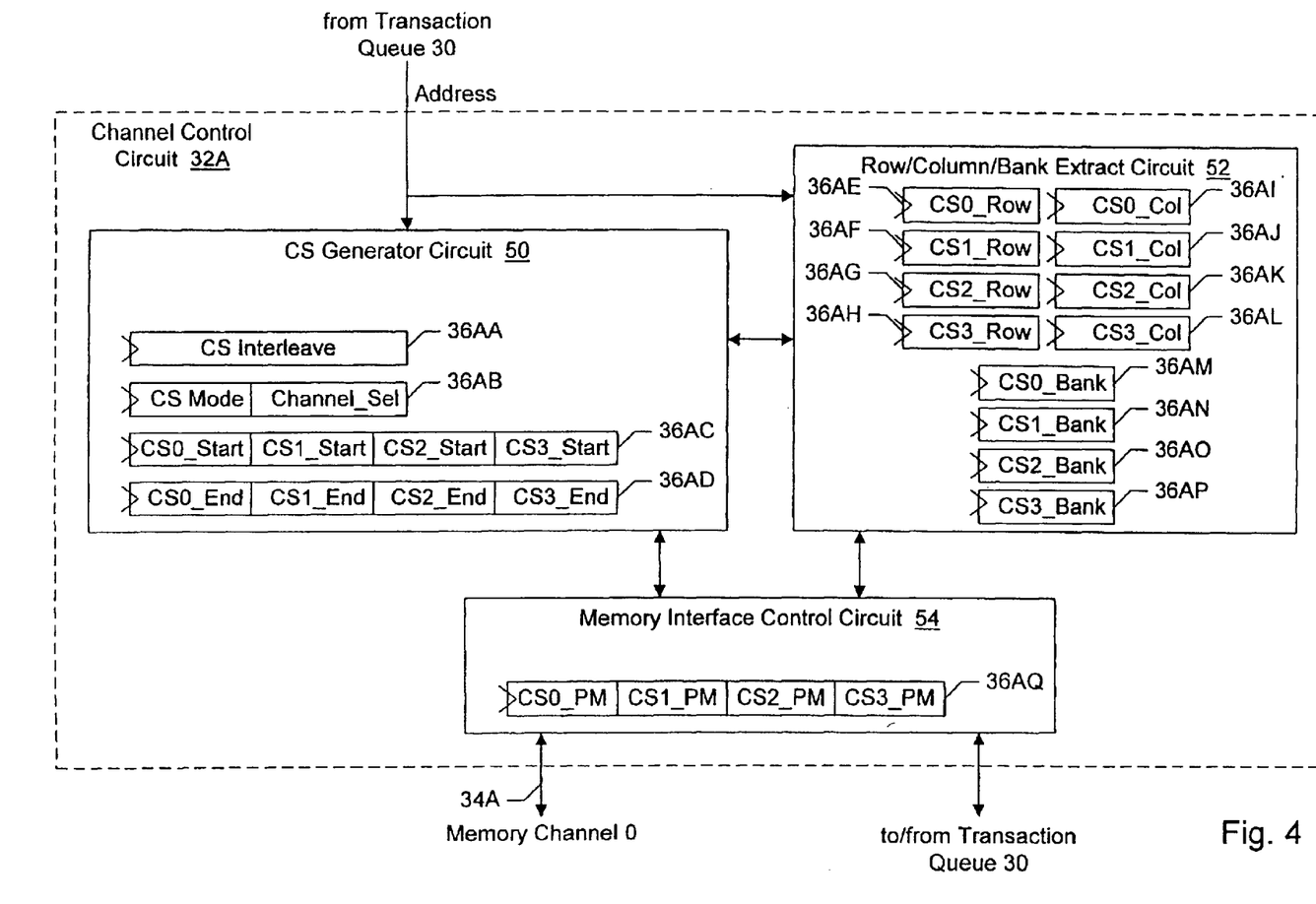
FIG. 4 is a block diagram of one embodiment of the channel control circuit in more detail.

Turning next to FIG. 4, a block diagram of one embodiment of channel control circuit 32A is shown. Other embodiments are possible and contemplated. Channel control circuit 32B may be similar. In the embodiment shown in FIG. 4, channel control circuit 32A includes a chip select (CS) generator circuit 50, a row/column/bank extract circuit 52, and a memory interface control circuit 54. CS generator circuit 50 and row/column/bank extract circuit 52 are coupled to receive an address of a memory transaction being issued to channel control circuit 32A from transaction queue 30 and are further coupled to memory interface control circuit 54 and to each other. Memory interface control circuit 54 is further coupled to channel 34A and to transaction queue 30. As illustrated in FIG. 4, CS generator circuit 50 includes configuration registers 36AA, 36AB, 36AC, and 36AD. Extract circuit 52 includes configuration registers 36AE, 36AF, 36AG, 36AH, 36AI, 36AJ, 36AK, 36AL, 36AM, 36AN, 36AO, and 36AP. Memory interface control circuit 54 includes configuration register 36AQ. Configuration registers 36AA–36AQ may be included in one embodiment of configuration registers 36A.

Extract circuit 52 is configured to extract portions of the address of a memory transaction for locating a storage location in the memory attached to channel 34A to be accessed in response to the memory transaction. Extract circuit 52 provides the extracted portions to memory interface control circuit 54 for use in communicating on channel 34A. For example, the illustrated embodiment may be used for SDRAM memory. Thus, portions of the address may be extracted to provide the row address, column address, and bank selection to the memory.

Via configuration registers 36AE–36AP, extract circuit 52 may be programmable to select which portions of the address are used for the row address, column address, and bank select. For example, in the illustrated embodiment, the portions of the address which are extracted as the row address, column address, and bank selection are separately programmable for each chip select signal supported by channel control circuit 52. Thus, configuration register 36AE is programmed with an indication of which portion of the address is extracted for the row address if CS0 is the chip select signal corresponding to the address. Similarly, configuration registers 36AF–36AH are programmed with indications of which portion of the address is extracted for the row address if CS1, CS2, or CS3 is the chip select signal corresponding to the address, respectively. Configuration register 36AI is programmed with an indication of which portion of the address is extracted for the column address if CS0 is the chip select signal corresponding to the address. Similarly, configuration registers 36AJ–36AL are programmed with indications of which portion of the address is extracted for the row address if CS1, CS2, or CS3 is the chip select for the address, respectively. Finally, configuration register 36AM is programmed with an indication of which portion of the address is extracted for the bank select if CS0 is the chip select signal corresponding to the address. Similarly, configuration registers 36AN–36AP are programmed with indications of which portion of the address is extracted for the bank select if CS1, CS2, or CS3 is the chip select signal corresponding to the address, respectively.

Extract circuit 52 may receive an indication of which chip select signal corresponds to the address of the memory transaction from CS generator circuit 50, and may extract the row address, column address, and bank selection from the address using the corresponding indications from configuration registers 36AE–36AP. For example, in one embodiment, each of configuration registers 36AE–36AP may store a bit mask having a bit assigned to each address bit. If the bit in the bit mask is set, the corresponding address bit is extracted and used in the row address, column address, or bank selection. If the bit in the mask is clear, the corresponding address bit is not extracted and used in the row address, column address, or bank selection. Alternatively, the bit in the bit mask being clear may indicate extraction of the corresponding address bit and the bit in the bit mask being set may indicate lack of extraction of the corresponding address bit.

In one particular implementation, each of the bit masks are required to identify contiguous address bits for inclusion in the corresponding row address, column address, or bank selection. The address bits used to form the row address need not be contiguous to the address bits used to form the column address or the bank selection, and the address bits used to form the column address need not be contiguous to the address bits used to form the row address or the bank selection. In such an implementation, extract circuit 52 may apply the bit mask to the address to mask off the non-selected address bits. Additionally, extract circuit 52 may right shift the masked address such that the least significant of the selected address bits is the least significant bit of the resulting value. The shifting and masking may be performed serially (in either order) or in parallel.

As an alternative to bit masks, configuration registers 36AE–36AP may be programmed in other fashions to indicate the portions of the address to be used as the row address, column address, and bank selection. For example, embodiments which require that contiguous address bits form a given row address, column address, or bank selection may be programmed with numbers indicating the least significant bit and most significant bit of the row address, column address, or bank selection. In yet another alternative, a number indicative of either the least significant bit or most significant bit and a bit mask selecting the number of address bits used by the corresponding memory may be programmed into configuration registers 36AE–36AP, as desired.

In another implementation, each of the bit masks are required to identify contiguous address bits for inclusion in the corresponding row address or bank selection. The address bits used to form the row address need not be contiguous to the address bits used to form the column address or the bank selection, and the address bits used to form the column address need not be contiguous to the address bits used to form the row address or the bank selection. As to the column address, the bit mask may be required to have two contiguous sections, with a gap of one or more bits between the sections. In one specific implementation, one of the sections may comprise bit 5 or bits 5 and 6 of the address (where the least significant address bit is referred to as bit 0 of the address) and the other section may comprise more significant bits. Such an implementation may allow for memory transactions to consecutive cache lines (for which address bits may vary in bit 5, or bits 5 and 6, only and thus may have the same row address and bank selection, but different column addresses) to be more likely to hit an open page in the memory, thus reducing the overall latency of the memory transactions. Such memory transactions may occur if a device frequently access blocks of memory which are larger than a cache line. The address bits between the address bits in the first section and the second section of the column address may be used for bank selection, for interleave selection among the memory sections assigned to different chip select signals (described in more detail below), for interleave selection between the channels (described in more detail below), etc.

CS generator circuit 50 is configured to generate the chip select signals for each memory transaction. The generated chip select signals are provided to memory interface control circuit 54 for transmission on channel 34A and to row/column/bank extract circuit 52. More particularly, CS generator circuit 50 is programmable, via configuration registers 36AA–36AD, to generate chip select signals. Configuration register 36AC is programmed with an indication of the starting address of a range of addresses mapped to each chip select, using respective fields CS0_Start, CS1_Start, CS2_Start, and CS3_Start as illustrated in FIG. 4. More particularly, in one embodiment, the most significant bits of the starting address may be programmed into the corresponding start field. The number of most significant bits provided in each field may be determined based on the minimum memory size which is supported for each chip select signal. For example, if the minimum supported memory size on a given chip select signal were 16 Megabytes, address bits more significant than bit 23 (where bit 0 is the least significant address bit) would be included in each field. Similarly, configuration register 36AD is programmed with an indication of the ending address of the range of addresses using respective fields CS0_End, CS1_End, CS2_End, and CS3_End as illustrated in FIG. 4. More particularly, in one embodiment, the most significant bits of the ending address plus 1 may be programmed into the corresponding end field. Thus, a given chip select signal may be decoded (subject to certain options described below) for an address if the most significant bits of the address are greater than or equal to the most significant bits of the start address for that given chip select signal and less than the most significant bits of the end address for that given chip select signal.

Additional flexibility in memory configuration may be provided via configuration registers 36AA and 36AB. Configuration register 36AB includes a CS mode field which may be programmed with various mode options for the chip select signals managed by channel control circuit 32A. For example, in one embodiment, portions of memory corresponding to two or more chip select signals may be interleaved while other portions are not interleaved. To interleave the memory corresponding to two chip select signals, the corresponding start and end addresses in configuration registers 36AC–36AD may be programmed to the same values (e.g. an address range large enough to cover the amount of memory assigned to both chip select signals), and an indication that the two chip select signals are interleaved may be programmed into the CS mode field of configuration register 36AB. In one implementation, channel control circuit 32A may provide for any of the following interleave options via encodings in the CS mode field: (i) no interleave; (ii) CS0 and CS1 memory sections interleaved, CS2 and CS3 memory sections not interleaved; (iii) CS1 and CS2 memory sections interleaved, CS0 and CS3 memory sections not interleaved; (iv) CS2 and CS3 memory sections interleaved, CS0 and CS1 memory sections not interleaved; (v) CS0, CS1, CS2, and CS3 memory sections interleaved. For example, in one embodiment, the CS mode field may comprise a four bit value, each bit assigned to one of the chip select signals. If the assigned bit is set, the memory section corresponding to that chip select signal is interleaved with the memory sections corresponding to other chip select signals for which the assigned bit in the CS mode field is also set. If the assigned bit is clear, the memory section corresponding to that chip select signal is not interleaved.

If the memory sections corresponding to two or more chip select signals are interleaved, configuration register 36AA may be programmed with an indication of which portion of the address is used to select between the interleaved memory sections. For example, configuration register 36AA may store a bit mask having set bits (or alternatively clear bits) for the bit or bits which identify which interleaved memory section is selected in response to an address, similar to the row, column, and bank select bit masks. Alternatively, bit numbers may be programmed into configuration register 36AA. For example, if memory sections corresponding to two chip select signals are interleaved, one bit of the address may be used to select the corresponding memory section and thus the chip select signal to activate. If memory sections corresponding to four chip select signals are interleaved, two bits of the address may be used to select the corresponding memory section and thus the chip select signal to activate.

In one embodiment, if the memory sections corresponding to two or more chip selects are interleaved, the other configuration parameters may be set the same (e.g. row, column, and bank configurations in configuration registers 36AE–36AP may be set the same).

Figure 5:
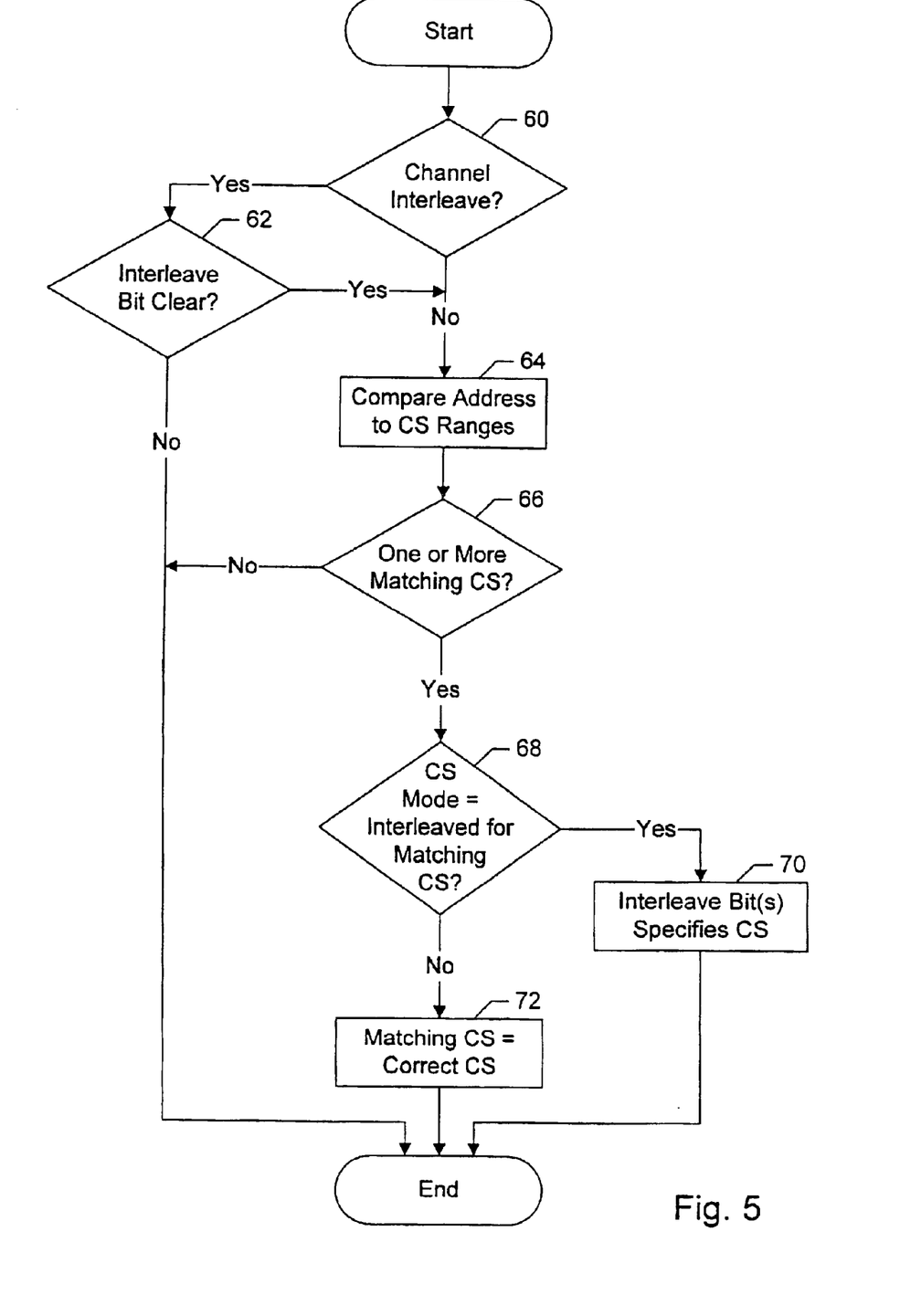
FIG. 5 is a flowchart illustrating one embodiment of chip select generation.

Channel control circuit 32A and more particularly CS generator circuit 50 may support channel interleaving as well. The Channel_Sel field of configuration register 36AB may store an indication of whether or not the channels are interleaved and an indication of the portion of the address used to select between the interleaved channels. In one embodiment in which memory controller 16 includes two channels, the Channel_Sel field may be a number which, if zero, indicates no channel interleave and, if non zero, indicates channel interleave and also is the bit number of the address which selects between the channels. Other embodiments may have more than two channels which may be interleaved, and the Channel_Sel field may be similar to the row indication in configuration register 36AE. Still further, the Channel_Sel field may comprise an indication of channel interleaving and a separate value (e.g. bit mask or bit numbers). If the channels are interleaved, other memory parameters may be set the same between the two channels (e.g. the remainder of configuration registers 36AA–36AQ and corresponding registers in configuration registers 36B may be set the same). FIG. 5 below is a flowchart illustrating chip select generation in more detail.

Memory interface control circuit 54 generally is configured to sequence commands on channel 34A to perform the desired memory transaction. Thus, memory interface control circuit 54 may receive additional transaction information from transaction queue 30, such as the size of the transaction, the read/write nature of the transaction, etc. Memory interface control circuit 54 may comprise a queue of in-progress transactions, with a scoreboard of commands to be sequenced at various times (e.g. measured on a clock cycle basis). The scoreboard may be shifted each clock cycle, and commands performed based on the state of the scoreboard.

Memory interface control circuit 54 may determine whether or not to close an active page after a transaction is complete. Memory interface control circuit 54 may be programmable, via configuration register 36AQ, with a page mode policy for the memory section corresponding each chip select signal. In one embodiment, the available page mode policies may include a close page policy in which the page is closed at the end of each transaction or a CAS time check policy in which transaction queue 30 is checked as the read or write command for a transaction is being issued on memory channel 34A. If other transactions to the same page are in transaction queue 30, the page may be kept open. Otherwise, the page may be closed. In yet another embodiment, the page mode policy may be based on a hint in the transaction. The page mode policy may be programmed differently for the memory corresponding to each of the chip selects, and thus configuration register 36AQ may include page mode policy fields CS0_PM, CS1_PM, CS2_PM, and CS3_PM for chip selects CS0–CS3, respectively.

As the above discussion illustrates, memory controller 16 may provide for a large amount of flexibility in configuring the memory to which memory controller 16 is coupled. For example, by allowing the row address, column address, and bank selection to be programmably selected from the address, the memory system may be optimized by software for the expected memory access patterns. If memory transactions, clustered relatively close in time, are expected to traverse through large blocks of memory, the bank selection may be drawn from more significant bits than the column selection, for example, allowing the memory transactions to experience an open page timing while leaving other banks available for intervening memory transactions to other addresses.

Having the interleave, or lack thereof, of memory sections corresponding to different chip select signals or channels programmable also provides for flexibility. For example, if accesses to certain address ranges are expected to be accessed with multiple memory transactions clustered close in time, then those address ranges may be represented by two or more interleaved memory sections corresponding to two or more interleaved chip select signals. Since pages may be open in the memory corresponding to each of the interleaved chip select signals, the interleaving may increase the possibility of receiving transactions which access an open page. On the other hand, other address ranges may not be expected to be accessed with multiple clustered memory transactions, and thus the corresponding memory may be configured as non-interleaved. The non-interleaved memory sections may have more open pages at different addresses, allowing for different transactions to access an open page. Similarly, interleaving channels may further increase the number of open pages in the affected memory range. On the other hand, higher memory bandwidth may be achieved by not interleaving the channels. Accordingly, software may optimize the configuration of memory based on the expected memory access pattern.

It is noted that, while the above discussion of FIG. 4 has described an embodiment for interfacing to SDRAM, other embodiments may interface to asynchronous DRAM, non-banked DRAM (including only row address and column address but no bank selection), SRAM, etc. Any suitable type of memory may be interfaced, and the configurability of memory controller 16 may be modified accordingly. Generally, some embodiments of memory controller 16 may be programmed to select at least one portion of the address for selecting a memory location in the memory using configuration registers 36A–36B.

It is noted that, while the illustrated embodiment provides for programmability of row address, column address, bank selection, and page mode policy on a chip select granularity, other embodiments may provide for programmability of one or more of these attributes at the channel granularity instead, in other embodiments.

It is noted that, while one implementation above includes a requirement that the various bit masks (e.g. row address bit mask, column address bit mask, etc.) select contiguous address bits for inclusion in the corresponding value, other embodiments may allow any random set of address bits to be selected.

It is noted that, while FIG. 4 illustrates a specific allocation of values to certain configuration registers 36AA–36AQ, the information stored may be rearranged into any combination of registers according to design choice. It is further noted that, while the illustrated embodiment supports 4 chip select signals, other embodiments may support any number of chip select signals, according to design choice.

It is still further noted that, while the embodiment of FIG. 4 provides for programmability of a variety of memory system features, other embodiments may employ any subset of the programmability, as desired. For example, chip select interleave could be programmable while row address, column address, and bank selection could be fixed based on memory size. Alternatively, chip select interleave might not be programmable (and might be interleaved, partially interleaved, or not interleaved), but row address, column address, and bank selection may be programmable.

It is noted that, while CS generator circuit 50, extract circuit 52, and memory interface control circuit 54 are shown as separate circuits in FIG. 4 for ease of understanding the programmability of memory controller 16, these circuits may be integrated together in implementation, if desired.

As used herein, the term "bit mask" refers to a binary value in which each bit corresponds to one or more bits of a first value to be masked by the bit mask. The bit being in one state (set or clear) may indicate a masking off of the one or more bits of the first value in the masking operation, while the bit being in the other state may indicate passing through of the one or more bits of the first value in the masking operation.

As used herein, the term "memory section" refers to a one or more memory circuits which are treated as a unit by memory controller 16. Thus, the memory circuits which receive a particular chip select signal may be a memory section, in one example. The memory circuits on one channel of memory controller 16 may be a memory section, in another example. Generally, a memory circuit may be any type of memory circuit, including DIMMs, SIMMs, memory chips directly mounted on a circuit board to which memory controller 16 (or system 10) is mounted, etc. The memory circuits may be SDRAM, DRAM, or any other form of memory, as desired.

As used herein, two or more memory sections are "interleaved" if an address region is mapped to the combination of the memory sections and the address range is divided into blocks, where the number of blocks is at least twice the number of memory sections. The blocks are alternately mapped to each of the interleaved memory sections. The number of blocks may be dependent on which address bit or bits is used to select between the interleaved portions as compared to the bits used to form the row address, column address, etc.

As used herein, the term "page mode policy" refers to the policy used to determine whether or not to keep a page accessed by a memory transaction open after the transaction is performed. Generally, a page refers to the amount of memory made accessible by presenting one row address to the memory (e.g. via an activate command in an SDRAM or via assertion of the RAS signal in an asynchronous DRAM). A page is open if the row address has been transmitted and the page has not been closed (e.g. with a precharge command or via autoprecharge in an SDRAM or by deassertion of the RAS signal in an asynchronous DRAM). Accesses to an open page present the column address to the memory, but need not perform the row address transfer, and thus may be performed with lower latency than if the row address were to be presented as well.

Turning next to FIG. 5, a flowchart is shown illustrating generation of chip select signals for channel control circuit 32A according to one embodiment of memory controller 16. Other embodiments are possible and contemplated. While the blocks shown in FIG. 5 are illustrated in a particular order for ease of understanding, any suitable order may be used. Furthermore, blocks may be performed in parallel in combinatorial logic circuitry within memory controller 16.

Memory controller 16 determines if channel interleaving is programmed into configuration registers 36A–36B (decision block 60). More particularly, memory controller 16 may examine the Channel_Sel field of configuration register 36AB. If channel interleaving is selected, memory controller 16 further determines if the address bit used to select between the interleaved channels is clear (decision block 62). If the address bit is not clear, the memory transaction is mapped to channel control circuit 32B and thus no chip selects in channel control circuit 32A are generated.

On the other hand, if channel interleaving is not programmed into configuration registers 36A–36B or the address bit used to select between the interleaved channels is clear, then channel control circuit 32A may handle the memory transaction. The address of the memory transaction is compared to the CS address ranges programmed into configuration registers 36AC–36AD (block 64). Memory controller 16 determines if one or more of the CS ranges include the address of the memory transaction (decision block 66). If none of the CS ranges encompasses the address, then channel control circuit 32A does not handle the memory transaction. On the other hand, if at least one CS range encompasses the address, then channel control circuit 32A does handle th e memory transaction.

Memory controller 16 determines if the CS mode is interleaved for the CS range(s) encompassing the address of the memory transaction (decision block 68). If the CS mode is interleaved, then the CS interleave indication in configuration registers 36AA specifies which chip select signal to activate for the memory transaction (block 70). If the CS mode is not interleaved, then the CS range which encompasses the address identifies which chip select signal to activate (block 72).

It is noted that a similar flowchart may be applicable to channel control circuit 32B, except that decision block 62 checks that the address bit used to select between the interleaved channels is set. Other embodiments having more than two channels which may be interleaved may use more than one bit, similar to the CS interleaving.

It is noted that the circuitry performing the flowchart of FIG. 5 may be partially CS generator circuit 50 circuitry and partially transaction queue 30 circuitry. For example, in one embodiment transaction queue 30 issues a memory transaction to the correct channel control circuit 32A–32B based on configuration registers 36A–36B. In such an embodiment, all of the flowchart in FIG. 5 could be implemented in transaction queue 30 and transaction queue 30 may send an indication of the appropriate chip select signal to that channel control circuit 32A–32B. CS generator circuit 50 may be eliminated in such an embodiment. Alternatively, for example, transaction queue 30 could perform blocks 60, 62, 64, and 66 to determine which of channel control circuits 32A–32B to issue the memory transaction to. CS generator circuit 50 may the perform blocks 64, 68, 70, and 72. In yet another alternative, transaction queue 30 may broadcast a transaction to both channel control circuits 32A–32B. In such an embodiment, CS generator circuit 50 may perform all of the flowchart in FIG. 5.

Figure 6:
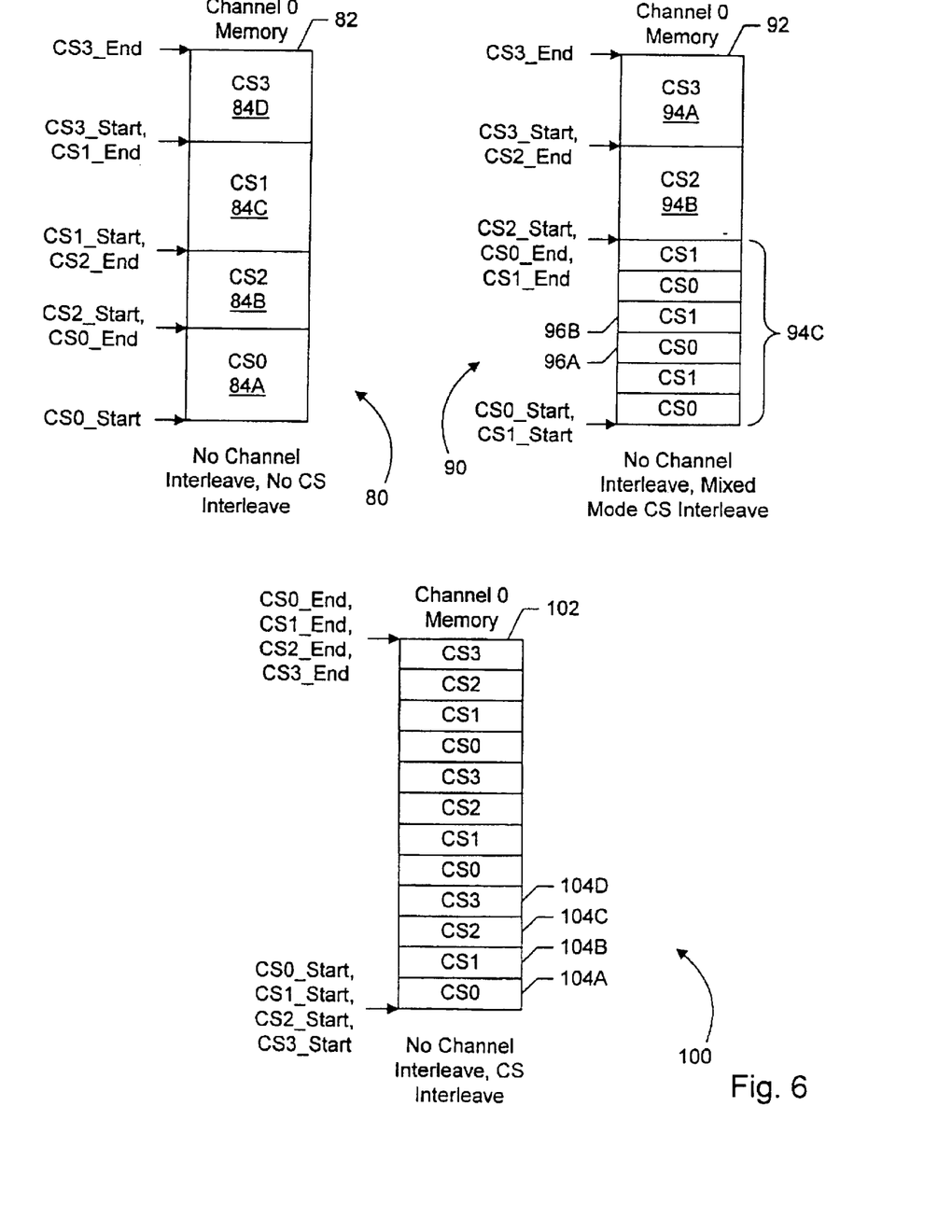
FIG. 6 is a block diagram illustrating an example of various CS interleave modes.

Turning next to FIG. 6, several examples of programmable CS interleaving modes are shown. For each of the examples in FIG. 6, channel interleaving is not selected.

The first example 80 illustrates a CS interleaving mode of no interleaving. Thus, the channel 0 memory 82 is divided into 4 separate CS regions 84A–84D. The CS regions may be of varying sizes. As illustrated via the arrows pointing to the channel 0 memory 82, the CS_Start for each CS is programmed to the lower end of the range mapped to that CS and the CS_End is programmed to the upper end of that range (and thus may be equal to the CS_Start of the next CS). Also illustrated in example 80 is that the CS regions need not follow the numbering of the CS signals. For example, the CS range corresponding to CS2 is assigned to lower addresses than the CS range corresponding to CS1. Any order of CS range assignments may be made, as desired.

The second example 90 illustrates a CS interleaving mode of mixed mode interleaving. Mixed mode CS interleaving refers to the situation in which two or more memory sections corresponding to two or more CS signals are interleaved while other memory sections corresponding to other CS signals are not interleaved. In example 90, CS0 and CS1 are interleaved and CS2 and CS3 are not interleaved. Thus, the channel 0 memory 92 is divided into three CS regions 94A–94C. Like example 82, regions 94A–94B each correspond to a CS (CS3 and CS2, respectively) and the corresponding start and end address fields are programmed as illustrated. On the other hand, region 94C corresponds to both CS1 and CS0, and thus the start and end address fields for CS1 and CS0 are both programmed to represent region 94C. Additionally, an address bit is defined (in configuration register 36AA) to determine the interleave of the CS0 and CS1 regions. Thus region 94C is divided into subregions (e.g. subregions 96A–96B). The subregions are alternately assigned to CS0 and CS1.

The third example 100 illustrates a CS interleaving mode of full interleaving, in which all memory sections corresponding to all CS signals are interleaved. Thus, channel 0 memory 102 is a single region. The CS start and end fields are all programmed to represent the addresses of the full memory size. Additionally, two address bits are defined (in configuration register 36AA) to determine the interleave of the CS0, CS1, CS2, and CS3 regions. Memory 102 is divided into multiple subregions (e.g. subregions 104A–104D). The subregions are alternately assigned to CS0, CS1, CS2, and CS3 as shown.

Figure 7:
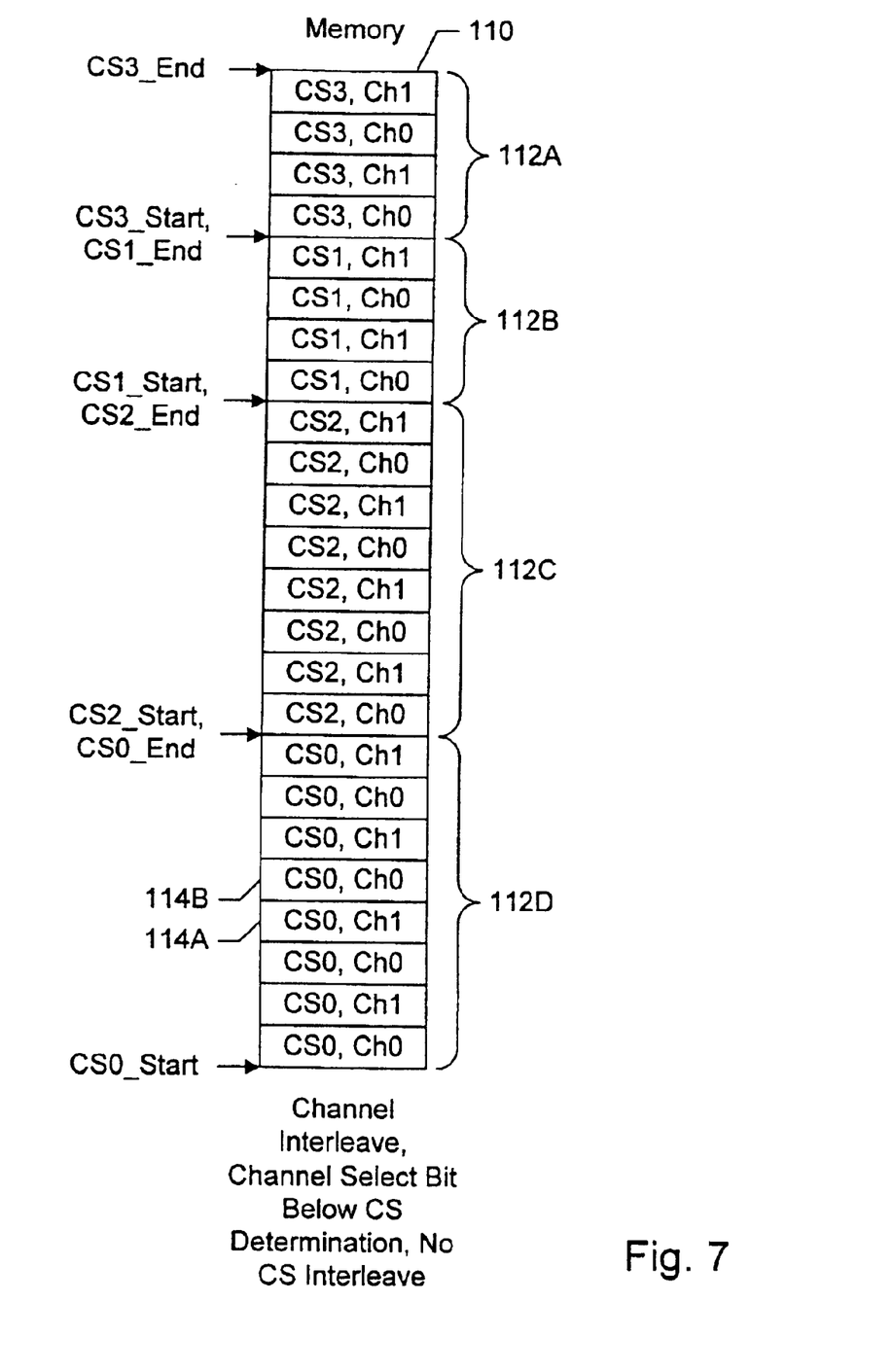
FIG. 7 is a block diagram illustrating an example of channel interleaving.

Turning now to FIG. 7, an example of channel interleaving is shown. In the example, no CS interleaving is programmed although CS interleaving can be programmed as well, if desired. Additionally, FIG. 7 illustrates an example in which the address bit used to select between the channels is a less significant address bit than the address bits which determine the CS regions. Accordingly, the memory 110 is divided into four separate CS regions 112A–112D. Each CS region is divided into subregions (e.g. subregions 114A and 114B in CS region 12D). The subregions are alternately assigned to channel zero and channel one (Ch0 and Ch1 in FIG. 7).

Figure 8:
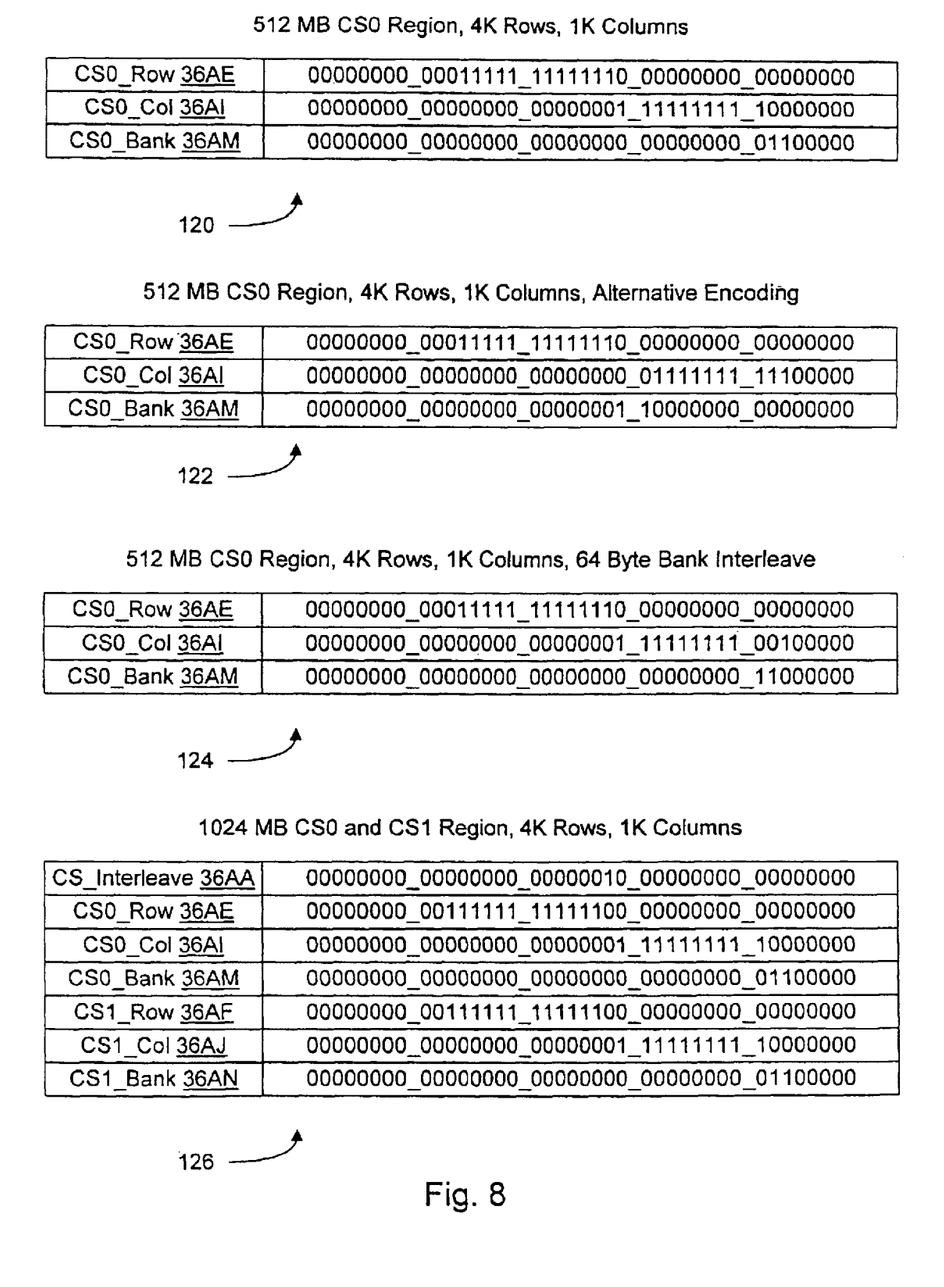
FIG. 8 is a set of examples according to one embodiment of the memory controller.

Turning next to FIG. 8, several examples of row address, column address, and bank address configurations are shown. More particularly, exemplary values for various configuration registers are illustrated in FIG. 8. The exemplary values are illustrated for an embodiment which uses bit masks to define the portion of the address used for the row address, column address, and bank selection. The examples of FIG. 8 correspond to 40 bit addresses of memory transactions. Other embodiments may have more or fewer address bits, as desired. The least significant bits are on the right in FIG. 8. Additionally, the bit masks are divided (via underscores) into 8 bit portions in FIG. 8 to ease viewing. The underscores are not actually stored in the corresponding configuration registers.

The first example 120 illustrates a configuration for a 512 Megabyte (MB) CS0 region in which the memory has 4096 rows (4K) and 1024 columns (1K). Thus, the row address comprises 12 bits and the column address comprises 10 bits. Additionally, the CS0 region may include four banks and thus the bank selection includes two bits. The contents of configuration registers 36AE, 36AI, and 36AM are illustrated in first example 120. In first example 120, the bank selection is programmed to select from less significant bits of the address than the column address is selected from, and the column address is selected from less significant bits than the row address is selected from. More particularly, if the least significant bit of the address is referred to as bit 0, address bits 5 and 6 are used to form the bank selection given the contents of configuration register 36AM in this example. Similarly, address bits 7–16 are used to form the column address given the contents of configuration register 36AI in this example and address bits 17–28 are used to form the row address given the contents of configuration register 36AE in this example.

A second example 122 is shown having the same CS0 region (512 MB, 4K roses, 1K columns). The contents of configuration registers 36AE, 36AI, and 36AM are illustrated in second example 122 as well. However, in the second example 122, the bank selection is programmed to select from more significant bits than the column address is selected from, but less significant bits than the row address is selected from. More particularly, if the least significant bit of the address is referred to as bit 0, address bits 15 and 16 are used to form the bank selection given the contents of configuration register 36AM in this example. Similarly, address bits 5–14 are used to form the column address given the contents of configuration register 36AI in this example and address bits 17–28 are used to form the row address given the contents of configuration register 36AE in this example.

A third example 124 is shown having the same CS0 region (512 MB, 4K roses, 1K columns). The contents of configuration registers 36AE, 36AI, and 36AM are illustrated in the third example 124 as well. However, in the third example 124, the column address bit mask includes a gap large enough for the bank selection mask to select bits. Thus, the column address is selected from bits 5 and 8 to 16 (where bit 0 is the least significant bit) of the address of the memory transaction and the bank selection is selected from bits 6 and 7 of the address of the memory transaction. It is noted that, if CS interleaving or channel interleaving were used with CS0, additional bits could be included in the gap in the column address bit mask and the bits which determine which interleaved CS or channel is selected can be bits within the gap as well.

Examples 120–124 illustrate some of the flexibility available in configuring the memory by configuring the selection of row address, column address, and bank selection. In the configuration of the example 120, the bank selection is selected from the least significant bits out of the row address, column address, and bank selection. Thus, if a set of consecutive memory accesses accessed contiguous cache lines (which are 32 bytes in the illustrated embodiment), the bank selection would change each time before the column address changes. Thus, at least a few of the set of consecutive memory transactions might not encounter an open page, but subsequent transactions of the set might encounter open pages in each bank. On the other hand, the configuration of example 122 may provide an open page for up to 1K contiguous cache lines, all in the same bank. The pages open in other banks may not be affected by the set of consecutive memory transactions. Example 124 would provide an open page for the next consecutive cache line, and then the bank selection would switch. Each example may have advantages for different memory access patterns, and thus may be used based on the expected memory access patterns to CS0.

A fourth example 126 is shown in FIG. 8 as well. The fourth example is a 1024 M (1 Gigabyte) CS0 and CS1 interleaved region, where each of the interleaved memory sections is 512 MB with 4K rows and 1K columns. Thus, in example 126 the contents of configuration registers 36AA, 36AE–36AF, 36AI–36AJ, and 36AM–36AN are shown. In the example configuration registers 36AE and 36AF are programmed to the same values, as are configuration registers 36AI and 36AJ and configuration registers 36AM and 36AN. More particularly, the configuration registers are programmed such that the bank is selected from less significant address bits than the column address is selected from, and the column address is selected from less significant address bits than the row address is selected from. However, there is a gap between the address bits selected for the row address and the address bits selected for the column address. The gap is the bit selected, in configuration register 36AA, to be the address bit which selects between CS0 and CS1. Other examples are possible as well, including examples similar to example 122 and example 124. Furthermore, the address bit which selects between CS0 and CS1 could be between the address bits selected for the column address and the address bits selected for the bank selection, or a less significant address bit than the bank selection, etc.

Figure 9:
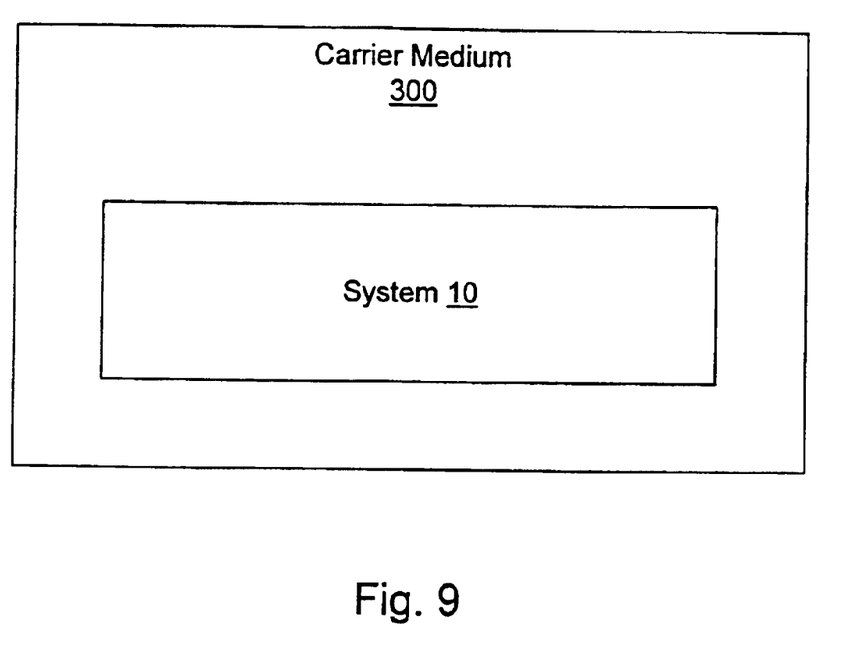
FIG. 9 is a block diagram of a carrier medium.

Turning next to FIG. 9, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media, e.g. or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any combination of a memory controller, channel control circuit, configuration registers, memory, etc.

Numerous variations and modifications will become apparent to those skilled in the art once the above disclosure is fully appreciated. It is intended that the following claims be interpreted to embrace all such variations and modifications.

What is claimed is:

1. A memory controller comprising:
   a first channel control circuit configured to couple to a first channel to access a first memory section, the first channel control circuit including programmable first registers to indicate starting and ending addresses for chip select mapping of the first memory section;
   a second channel control circuit configured to couple to a second channel to access a second memory section, the second channel control circuit including programmable second resisters to indicate starting and ending addresses for chip select mapping of the second memory section, wherein the second channel is independent of and separate from the first channel; and a programmable channel register in each of the first and second channel control circuits to be programmed to indicate that the first and second channels are to be interleaved when mapped, the interleaved channels to be mapped into sub-regions of one or more chip select mapped regions.

2. The memory controller as recited in claim 1 wherein an address bit is to be used to select between the interleaved first and second channels.

3. The memory controller as recited in claim 2 wherein one or more of the chip select mapped regions are also interleaved.

4. The memory controller as recited in claim 1 wherein an address bit, that is less significant than address bits that are to determine the one or more chip select mapped regions, is to be used to select between the interleaved first and second channels.

5. A system comprising:
   a processor configured to transmit an address of a memory location to be accessed; and
   a memory controller coupled to receive the address from the processor, wherein the memory controller further comprises:
   i) a first channel control circuit configured to couple to a first channel to access a first memory section, the first channel control circuit including programmable first registers to indicate starting and ending addresses for chip select mapping of the first memory section;
   ii) a second channel control circuit configured to couple to a second channel to access a second memory section, the second channel control circuit including programmable second registers to indicate starting and ending addresses for chip select mapping of the second memory section, wherein the second channel is independent of and separate from the first channel; and
   iii) a programmable channel register in each of the first and second channel control circuits to be programmed to indicate that the first and second channels are to be interleaved when mapped, the interleaved channels to be mapped into subregions of one or more chip select mapped regions.

6. The system as recited in claim 5 wherein an address bit is to be used to select between the interleaved first and second channels.

7. The system as recited in claim 6 wherein one or more of the chip select mapped regions are also interleaved.

8. The system as recited in claim 5 wherein an address bit, that is less significant than address bits that are to determine the one or more chip select mapped regions, is to be used to select between the interleaved first and second channels.

* * * * *